United States Patent
Drummond et al.

(10) Patent No.: US 12,277,621 B2
(45) Date of Patent: Apr. 15, 2025

(54) RESPONDING TO REPRESENTATIONS OF PHYSICAL ELEMENTS

(71) Applicant: Apple Inc., Cupertino, CA (US)

(72) Inventors: Mark Drummond, Palo Alto, CA (US);
Bo Morgan, Emerald Hills, CA (US);
Siva Chandra Mouli Sivapurapu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 68 days.

(21) Appl. No.: 17/465,334

(22) Filed: Sep. 2, 2021

(65) Prior Publication Data

US 2021/0398327 A1 Dec. 23, 2021

Related U.S. Application Data

(63) Continuation of application No. PCT/US2020/028966, filed on Apr. 20, 2020.

(60) Provisional application No. 62/837,287, filed on Apr. 23, 2019.

(51) Int. Cl.
*G06T 11/00* (2006.01)
*G06T 13/40* (2011.01)
*G06T 13/80* (2011.01)

(52) U.S. Cl.
CPC .............. *G06T 11/00* (2013.01); *G06T 13/40* (2013.01); *G06T 13/80* (2013.01); *G06T 2200/24* (2013.01)

(58) Field of Classification Search
None
See application file for complete search history.

(56) References Cited

U.S. PATENT DOCUMENTS

2005/0143138 A1 6/2005 Lee et al.
2012/0179651 A1 7/2012 Marchese
(Continued)

FOREIGN PATENT DOCUMENTS

CN 104142995 A 11/2014

OTHER PUBLICATIONS

Piumsomboon et al.; "Mini-Me: An adaptive Avatar for Mixed Reality Remote Collaboration;" Apr. 21-26, 2018; CHI 2018; pp. 1-13 (Year: 2018).*
(Continued)

*Primary Examiner* — Peter Hoang
(74) *Attorney, Agent, or Firm* — Fernando & Partners, LLP

(57) ABSTRACT

In some implementations, a method includes obtaining, by a virtual intelligent agent (VIA), a perceptual property vector (PPV) for a graphical representation of a physical element. In some implementations, the PPV includes one or more perceptual characteristic values characterizing the graphical representation of the physical element. In some implementations, the method includes instantiating a graphical representation of the VIA in a graphical environment that includes the graphical representation of the physical element and an affordance that is associated with the graphical representation of the physical element. In some implementations, the method includes generating, by the VIA, an action for the graphical representation of the VIA based on the PPV. In some implementations, the method includes displaying a manipulation of the affordance by the graphical representation of the VIA in order to effectuate the action generated by the VIA.

24 Claims, 8 Drawing Sheets

(56) References Cited

U.S. PATENT DOCUMENTS

| | | | | |
|---|---|---|---|---|
| 2013/0307842 A1* | 11/2013 | Grinberg | ................ | G06F 1/163 |
| | | | | 345/419 |
| 2015/0260990 A1* | 9/2015 | Ueno | .................... | G09G 3/003 |
| | | | | 345/419 |
| 2017/0187852 A1 | 6/2017 | Baek et al. | | |
| 2018/0365898 A1 | 12/2018 | Costa | | |
| 2019/0196576 A1* | 6/2019 | Saarinen | ................ | G06V 20/20 |
| 2020/0111262 A1* | 4/2020 | Rabinovich | .......... | G02B 27/017 |

OTHER PUBLICATIONS

PCT International Search Report and Written Opinion dated Jul. 14, 2020, International Application No. PCT/US2020/028966, pp. 1-10.

* cited by examiner

RESPONDING TO REPRESENTATIONS OF PHYSICAL ELEMENTS

CROSS-REFERENCE TO RELATED APPLICATION

This application is a continuation of Intl. Patent App. No. PCT/US2020/28966, filed on Apr. 20, 2020, which claims priority to U.S. Provisional Patent App. No. 62/837,287, filed on Apr. 23, 2019, which are both hereby incorporated by reference in their entirety.

TECHNICAL FIELD

The present disclosure generally relates to responding to representations of physical elements.

BACKGROUND

Some devices are capable of generating and presenting environments. Some devices that present environments include mobile communication devices such as smartphones. Most previously available devices that present an environment are ineffective at allowing a user to interact with the environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
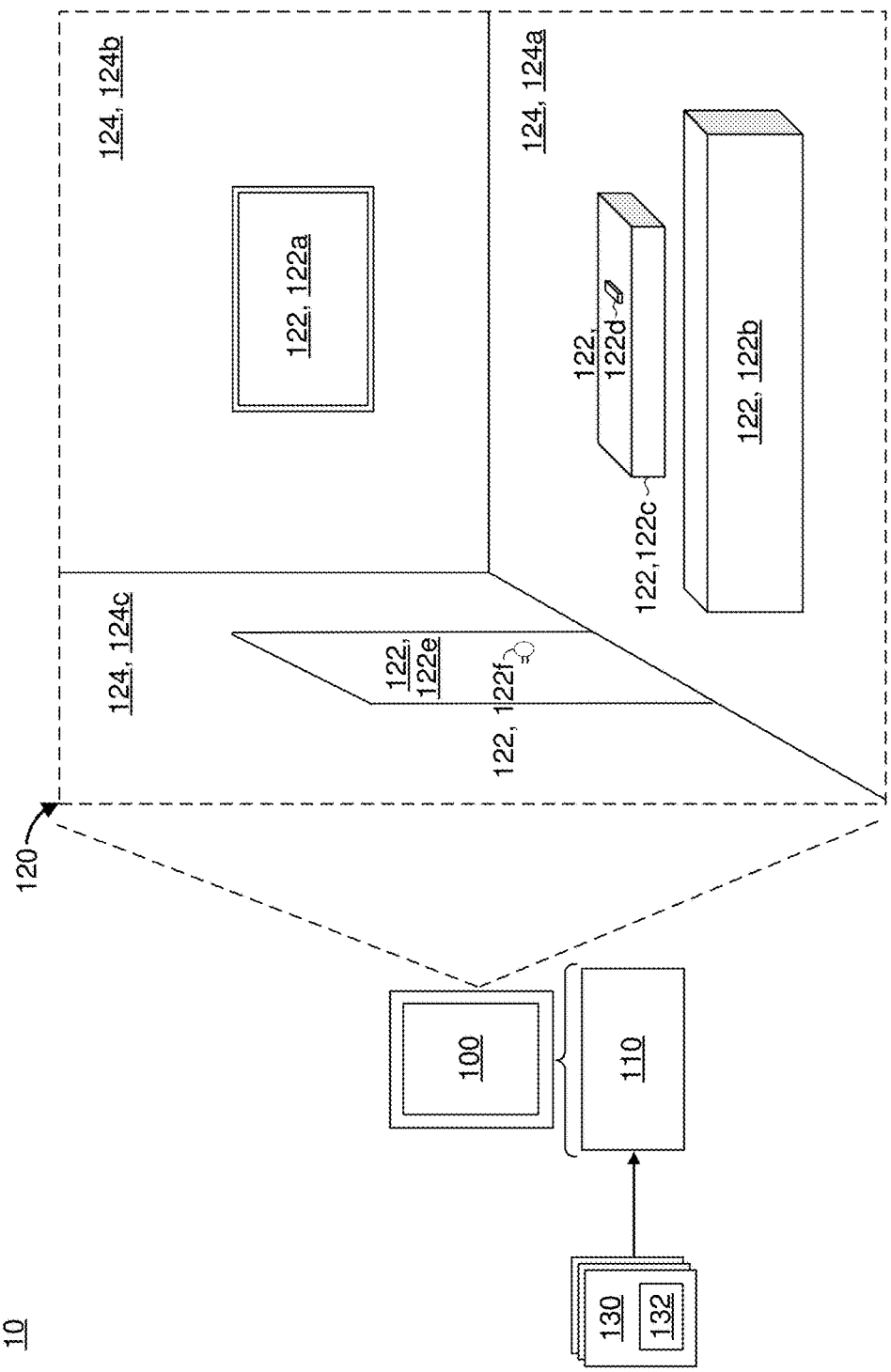
FIGS. 1A-1D are diagrams illustrating a virtual intelligent agent (VIA) interacting with graphical representations of physical elements in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods that enable a virtual intelligent agent (VIA) (e.g., an intelligent agent (IA)) to detect and interact with graphical representations of physical elements. In various implementations, a device includes a non-transitory memory and one or more processors coupled with the non-transitory memory. In some implementations, a method includes obtaining, by a virtual intelligent agent (VIA), a perceptual property vector (PPV) for a graphical representation of a physical element. In some implementations, the PPV includes one or more perceptual characteristic values characterizing the graphical representation of the physical element. In some implementations, the method includes instantiating a graphical representation of the VIA in a graphical environment that includes the graphical representation of the physical element and an affordance that is associated with the graphical representation of the physical element. In some implementations, the method includes generating, by the VIA, an action for the graphical representation of the VIA based on the PPV. In some implementations, the method includes displaying a manipulation of the affordance by the graphical representation of the VIA to effectuate the action generated by the VIA.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices that enable a graphical representation of a virtual intelligent agent (VIA) to detect and interact with graphical representations of physical elements. Many physical elements do not have electronic transceivers that emit data which identifies the physical elements. Such physical elements are sometimes referred to as passive physical elements. A perceptual property vector (PPV) for a graphical representation of a physical element includes perceptual characteristic values that characterize the graphical representation of the physical element. Populating a potentially detectable set of the VIA with the perceptual characteristic values allows the graphical representation of the VIA to detect and interact with the graphical representation of the physical element. The VIA utilizes the perceptual characteristic values included in the PPV to generate an action which involves an interaction between the graphical representation of the VIA and the graphical representation of the physical element. The graphical representation of the physical element is associated with an affordance. The graphical representation of the VIA manipulates the affordance associated with the graphical representation of the physical element to effectuate the action generated by the VIA. Hereinafter, graphical environments are referred to as XR environments and graphical representations are referred to as XR representations for the sake of brevity.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100.

In the example of FIG. 1A, the electronic device 100 is held by a user (not shown). In some implementations, the electronic device 100 includes a smartphone, a tablet, a laptop, or the like. In some implementations, the electronic device 100 includes a wearable computing device that is worn by the user. For example, in some implementations, the electronic device 100 includes a head-mountable device (HMD). In some implementations, the HMD is shaped to form a receptacle that receives a device with a display (e.g., the device with the display can be slid into the HMD to serve as a display for the HMD). Alternatively, in some implementations, the HMD includes an integrated display.

In various implementations, the electronic device 100 includes a virtual intelligent agent (VIA) 110. In various implementations, the VIA 110 performs an action in order to satisfy (e.g., complete or achieve) an objective of the VIA 110. In various implementations, the VIA 110 obtains the objective from a human operator (e.g., the user of the electronic device 100). For example, in some implementations, the VIA 110 generates responses to queries that the user of the electronic device 100 inputs into the electronic device 100. In some implementations, the VIA 110 synthesizes vocal responses to voice queries that the electronic device 100 detects. In various implementations, the VIA 110 performs electronic operations on the electronic device 100. For example, the VIA 110 composes messages in response to receiving an instruction from the user of the electronic device 100. In some implementations, the VIA 110 schedules calendar events, sets timers/alarms, provides navigation directions, reads incoming messages, and/or assists the user in operating the electronic device 100. In various implementations, the VIA 110 is referred to as an intelligent agent (IA).

In various implementations, the electronic device 100 presents an extended reality (XR) environment 120. In some implementations, the electronic device 100 receives the XR environment 120 from another device. In some implementations, the electronic device 100 retrieves the XR environment 120 from a non-transitory memory (e.g., from a remote data source). In some implementations, the electronic device 100 generates the XR environment 120. For example, in some implementations, the electronic device 100 synthesizes the XR environment 120 based on a semantic construction of a physical environment. In various implementations, the XR environment 120 corresponds to a physical environment. In some implementations, the XR environment 120 is within a degree of similarity to a corresponding physical environment.

In the example of FIG. 1A, the XR environment 120 includes XR representations of physical elements 122. In some implementations, the XR representations of physical elements 122 correspond to respective physical elements in a physical environment. In such implementations, the XR representations of physical elements 122 are within a degree of similarity to their corresponding physical elements. In the example of FIG. 1A, the XR environment 120 includes XR representations of bounding surfaces 124. In some implementations, the XR representations of bounding surfaces 124 correspond to respective physical surfaces in the physical environment. In such implementations, the XR representations of bounding surfaces 124 are within a degree of similarity to their corresponding physical surfaces.

In the example of FIG. 1A, the XR environment 120 includes an XR television 122a, an XR couch 122b, an XR coffee table 122c, an XR television remote 122d, an XR door 122e and an XR door handle 122f. In some implementations, the XR television 122a, the XR couch 122b, the XR coffee table 122c, the XR television remote 122d, the XR door 122e and the XR door handle 122f represent a real television, a real couch, a real coffee table, a real television remote, a real door and a real door handle, respectively, located in a physical environment represented by the XR environment 120.

In various implementations, XR properties of the XR representations of physical elements 122 are within a degree of similarity to physical properties of corresponding physical elements located in the physical environment. In some implementations, visual properties of the XR representations of physical elements 122 are selected to match visual properties of the corresponding physical elements located in the physical environment. For example, a color of the XR couch 122b is within a degree of similarity to a color of the corresponding real couch. Similarly, a texture of the XR coffee table 122c is within a degree of similarity to a texture of the corresponding real coffee table.

In the example of FIG. 1A, the XR representations of bounding surfaces 124 include an XR floor 124a, an XR front wall 124b and an XR side wall 124c. In some implementations, the XR floor 124a, the XR front wall 124b and the XR side wall 124c represent a real floor, a real front wall and a real side wall, respectively, of a physical environment represented by the XR environment 120. As such, the XR representations of bounding surfaces 124 are within a degree of similarity to physical surfaces in the physical environment.

In various implementations, the electronic device 100 obtains respective perceptual property vectors (PPVs) 130 for the XR representations of physical elements 122 and the XR representations of bounding surfaces 124. In various implementations, each PPV 130 includes one or more perceptual characteristic values 132 characterizing a corresponding XR representation of a physical element. For example, the PPVs 130 include a first PPV which includes a first set of perceptual characteristic values that characterize the XR television 122a (e.g., the first set of perceptual characteristic values indicate a size of the XR television 122a, a resolution of the XR television 122a, a refresh rate of the XR television 122a, etc.). Similarly, the PPVs 130 include a second PPV which includes a second set of perceptual characteristic values that characterize the XR couch 122b (e.g., the second set of perceptual characteristic values indicate a size, a color, a texture and/or a material of the XR couch 122b).

In various implementations, the perceptual characteristic values 132 characterize one or more physical properties of the XR representations of the physical elements 122. In some implementations, the perceptual characteristic values 132 characterize a texture of the XR representation. For example, the perceptual characteristic values 132 for an XR representation indicate whether the XR representation appears smooth or rough when touched by an XR object such as an XR representation of the VIA 110.

In some implementations, the perceptual characteristic values 132 characterize a hardness of the XR representation of the physical element. For example, the perceptual characteristic values 132 for the XR couch 122b characterize a hardness of an arm rest and/or a hardness of a cushion of the XR couch 122b. As another example, the perceptual characteristic values 132 for the XR floor 124a characterize a hardness of the XR floor 124a, which determines the result of dropping an XR object on the XR floor 124a. For example, if the perceptual characteristic values 132 for the XR floor 124a indicate that the XR floor 124a is as hard as concrete then dropping a delicate XR object such as a glass may result in the XR object breaking. However, if the perceptual characteristic values 132 for the XR floor 124a indicate that the XR floor 124a is as soft as carpet then dropping the delicate XR object may result in the XR object staying intact.

In various implementations, the perceptual characteristic values 132 characterize a smell of the XR representation of the physical element. For example, in some implementations, the perceptual characteristic values 132 define an odor function for the XR representation of the physical element. As an example, the perceptual characteristic values 132 for the XR couch 122b characterize how the XR couch 122b smells to an XR object such as an XR dog or an XR human.

Figure 1B:
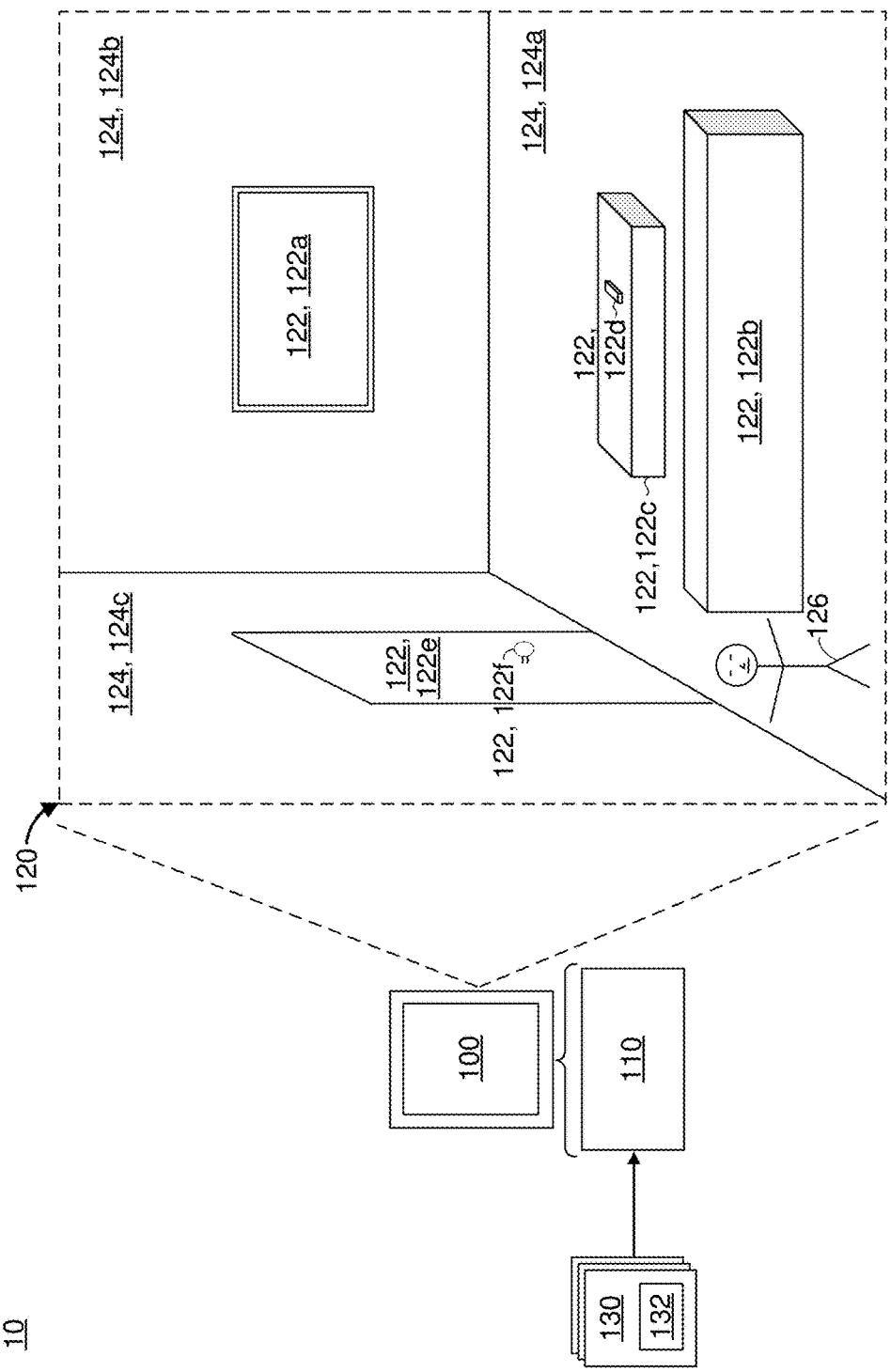

Referring to FIG. 1B, in some implementations, the XR environment 120 includes an XR representation 126 of the VIA 110. In the example of FIG. 1B, the XR representation 126 of the VIA 110 includes an XR human. In some implementations, a user of the electronic device 100 selects the XR representation 126 for the VIA 110 from a set of available XR representations. In various implementations, the XR representation 126 of the VIA 110 is customizable. For example, in some implementations, the XR representation 126 of the VIA 110 includes an XR dog, an XR robot, etc.

In various implementations, the XR representation 126 of the VIA 110 performs an action within the XR environment 120 in order to satisfy (e.g., complete or achieve) an objective of the VIA 110. In some implementations, the VIA 110 obtains the objective from a human operator (e.g., a user of the electronic device 100). In some implementations, the XR representation 126 of the VIA 110 obtains the objective from an XR representation of the human operator. For example, the XR representation 126 of the human operator instructs the XR representation 126 of the VIA 110 to perform an action in the XR environment 120.

In various implementations, the VIA 110 performs an action or causes performance of the action by manipulating the XR representation 126 of the VIA 110 in the XR environment 120. In some implementations, the XR representation 126 of the VIA 110 is able to perform XR actions that the XR representation of the human operator is incapable of performing. In some implementations, the XR representation 126 of the VIA 110 performs XR actions based on information that the VIA 110 obtains from a physical environment. For example, the XR representation 126 of the VIA 110 nudges the XR representation of the human operator when the VIA 110 detects ringing of a doorbell in the physical environment.

Figure 1C:
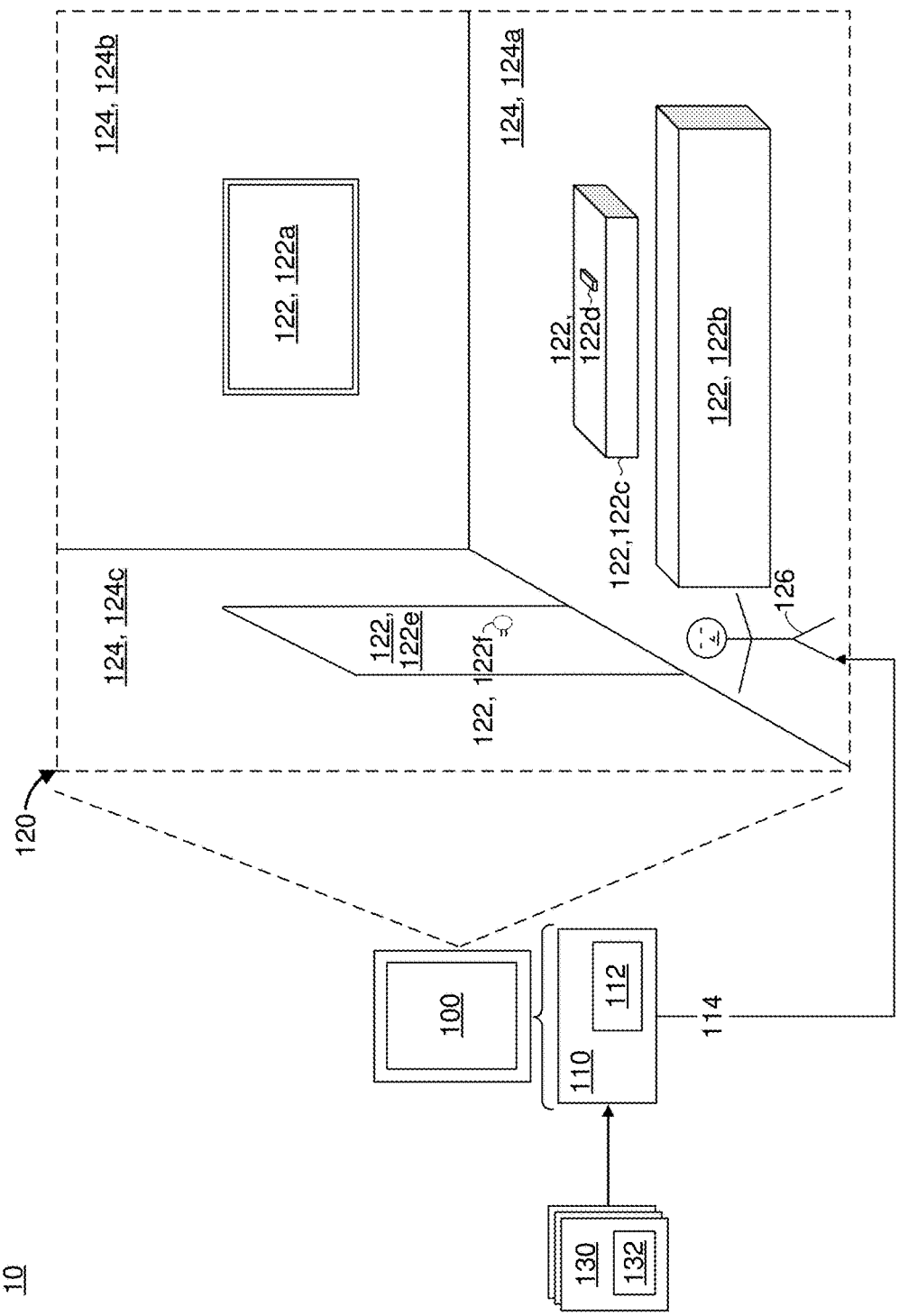

Referring to FIG. 1C, in various implementations, the XR representation 126 of the VIA 110 is associated with a potentially detectable set 112. In some implementations, the potentially detectable set 112 includes XR representations of physical elements that the XR representation 126 of the VIA 110 can detect (e.g., see, hear and/or smell). For example, the potentially detectable set 112 includes at least some of the XR representations of physical elements 122 in the XR environment 120. In some implementations, the potentially detectable set 112 includes perceptual characteristics values for various XR representations of physical elements that the XR representation 126 of the VIA 110 can detect.

In some implementations, the potentially detectable set 112 includes a potentially visible subset, a potentially audible subset and a potentially smellable subset. The potentially visible subset includes visual properties of the XR representations of physical elements 122 that the XR representation 126 of the VIA 110 can see (e.g., a display screen of the XR television 122a, a surface of the XR couch 122b, etc.). The potentially audible subset includes audible properties of the XR representations of physical elements 122 that the XR representation 126 of the VIA 110 can hear (e.g., sounds emitted by the XR television 122a, and sounds made by the XR door 122e when the XR door 122e opens/closes). The potentially smellable subset includes smell properties (e.g., olfaction properties) of the XR representations of physical elements 122 that the XR representation 126 of the VIA 110 can smell (e.g., an odor of the XR couch 122b).

In some implementations, the VIA 110 populates the potentially detectable set 112 based on the perceptual characteristic values 132 included in the PPVs 130. For example, the VIA 110 populates the potentially detectable set 112 with an odor function of the XR couch 122b in order to allow the XR representation 126 of the VIA 110 to smell an odor of the XR couch 122b. Populating the potentially detectable set 112 based on the PPVs 130 of the XR representations of physical elements 122 allows the XR representation 126 of the VIA 110 to detect and interact with the XR representations of physical elements 122.

In various implementations, the VIA 110 generates an action 114 for the XR representation 126 of the VIA 110 based on the PPV(s) 130. In some implementations, the action 114 includes detecting and/or interacting with one or more of the XR representations of physical elements 122. For example, in some implementations, the action 114 includes turning ON the XR television 122a, jumping on the XR couch 122b, opening the XR door 122e, etc.

Figure 1D:
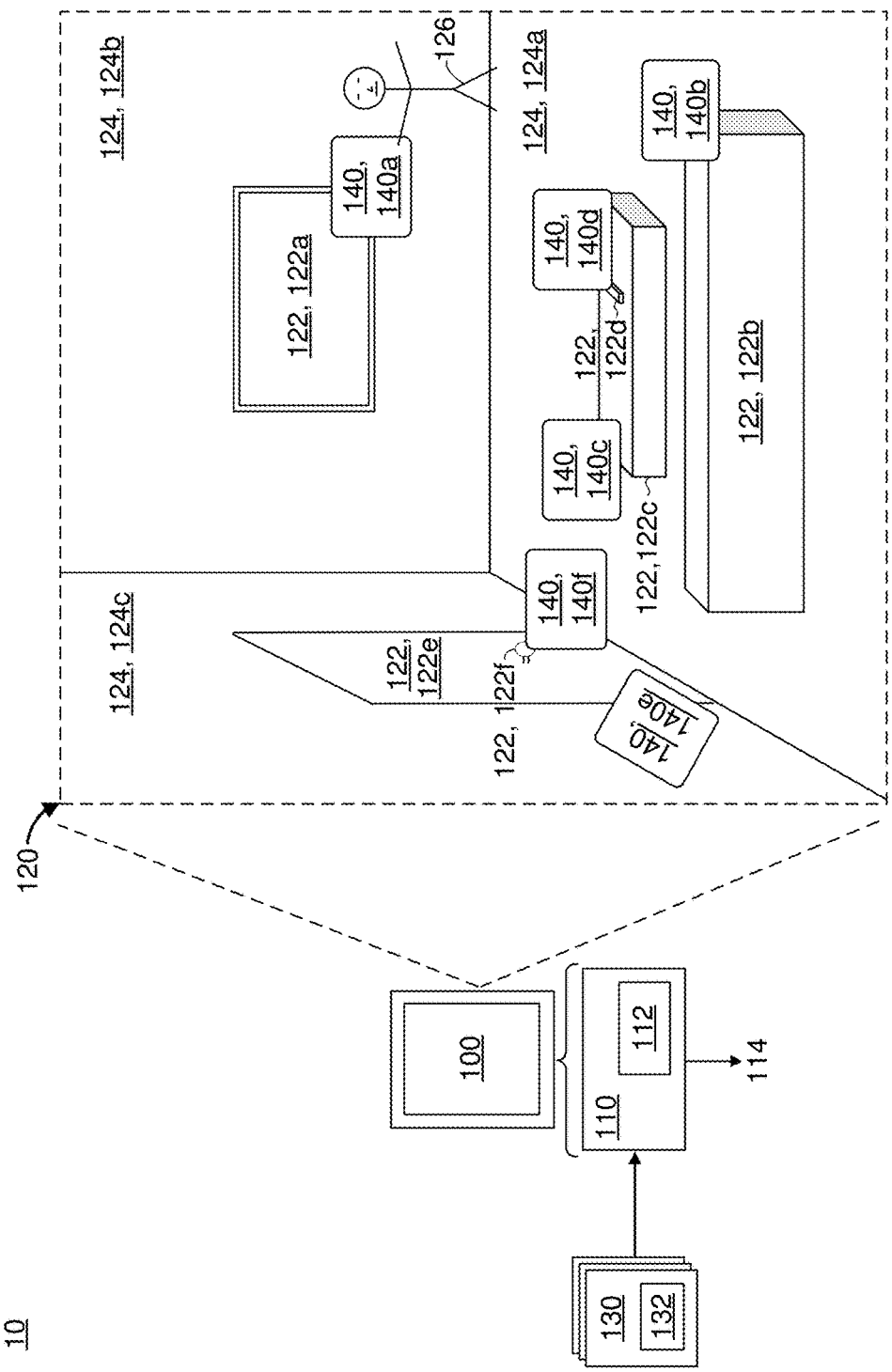

Referring to FIG. 1D, in various implementations, the electronic device 100 displays respective affordances 140 in association with the XR representations of physical elements 122. For example, the electronic device 100 composites a television affordance 140a in association with the XR television 122a, a couch affordance 140b in association with the XR couch 122b, a coffee table affordance 140c in association with the XR coffee table 122c, a television remote affordance 140d in association with the XR television remote 122d, a door affordance 140e in association with the XR door 122e, and a door handle affordance 140f in association with the XR door handle 122f.

In various implementations, the affordances 140 allow interaction with the corresponding XR representation of physical elements 122 in accordance with the perceptual characteristic values 132 included in their corresponding PPVs 130. For example, the television affordance 140a allows interaction with the XR television 122a in accordance with the perceptual characteristic values 132 included in the PPV 130 for the XR television 122a (e.g., the XR representation 126 of the VIA 110 can activate the television affordance 140a to turn the XR television 122a ON or OFF). Similarly, the door handle affordance 140f allows interaction with the XR door handle 122f in accordance with the perceptual characteristic values 132 included in the PPV 130 for the XR door handle 122f (e.g., the XR representation 126 of the VIA 110 can invoke the door handle affordance 140f to turn the XR door handle 122f).

In some implementations, the action 114 includes activating one or more of the affordances 140 to interact with the corresponding XR representation of physical elements 122. For example, in some implementations, the action 114 includes causing the XR representation 126 of the VIA 110 to move closer to the door handle affordance 140f and manipulating (e.g., activating) the door handle affordance 140f in order to turn the XR door handle 122f which can result in opening/closing of the XR door 122e. Similarly, in some implementations, the action 114 includes causing the XR representation 126 of the VIA 110 to move closer to the television remote affordance 140d and manipulating the television remote affordance 140d in order to pick-up the XR television remote 122d. After picking-up the television remote affordance 140d, the action 114 can cause the XR representation 126 of the VIA 110 to manipulate the television remote affordance 140d again in order to operate the XR television 122a via the XR television remote 122d. In the example of FIG. 1D, the XR representation 126 of the VIA 110 is manipulating the television affordance 140a, for example, because the action 114 is to turn the XR television 122a ON or OFF. More generally, in various implementations, the electronic device 100 displays a manipulation of one of the affordances 140 by the XR representation 126 of the VIA 110 in order to effectuate the action 114 generated by the VIA 110.

In some implementations, a head-mountable device (HMD) (not shown), being worn by a user, presents (e.g., displays) the XR environment 120 according to various implementations. In some implementations, the HMD includes an integrated display (e.g., a built-in display) that displays the XR environment 120. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 120.

Figure 2:
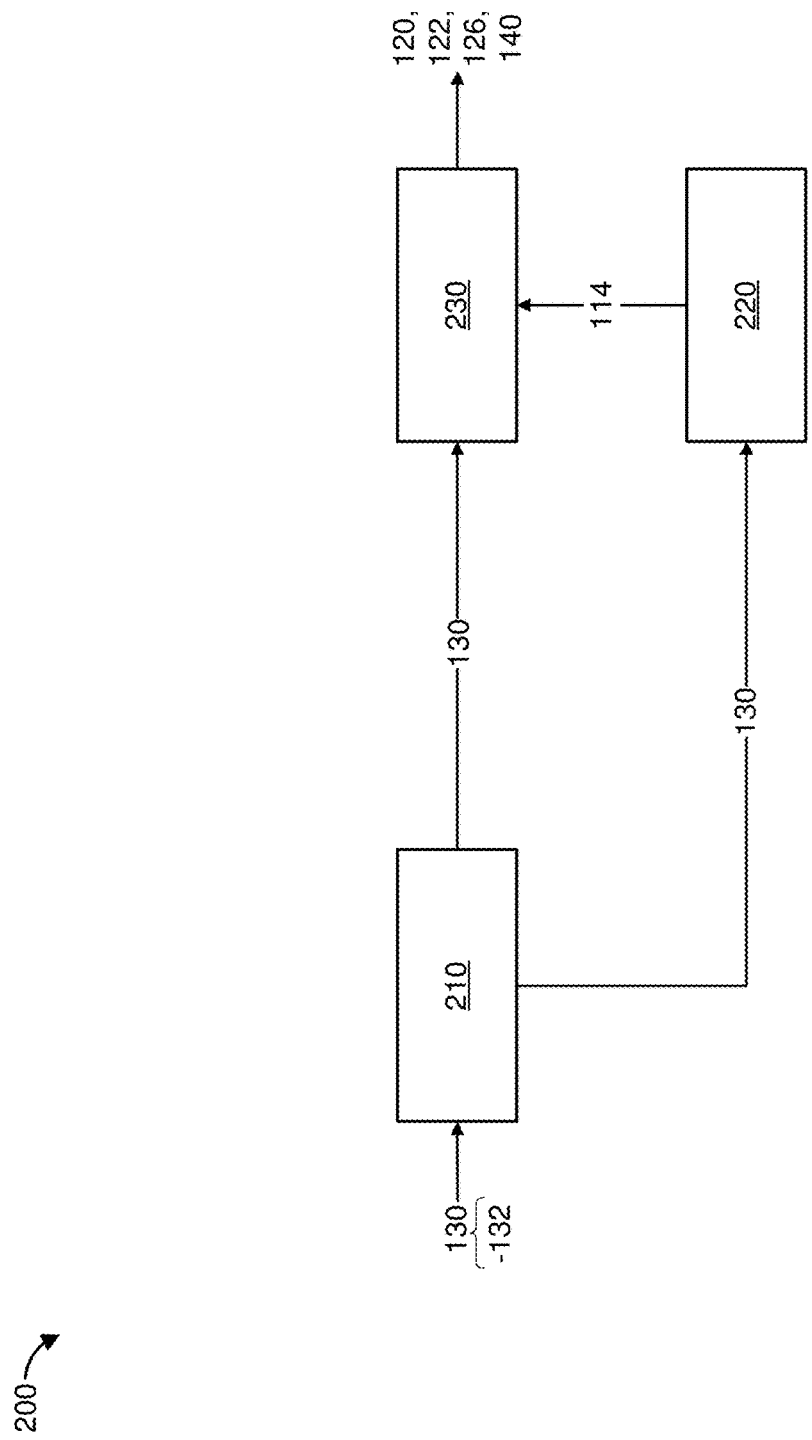
FIG. 2 is a block diagram of an example device in accordance with some implementations.

FIG. 2 illustrates a block diagram of an electronic device 200. In some implementations, the electronic device 200 implements the electronic device 100 shown in FIGS. 1A-1D. As illustrated in FIG. 2, in some implementations, the electronic device 200 includes a data obtainer 210, an action generator 220, and an XR environment generator 230.

In various implementations, the data obtainer 210 obtains the PPVs 130 for the XR representations of physical elements 122. As described herein, the PPVs 130 include respective perceptual characteristic values 132 characterizing the XR representations of physical elements 122. In some implementations, the data obtainer 210 retrieves the PPVs 130 from a non-transitory memory of the electronic device 200, or from a remote data source. In some implementations, the data obtainer 210 receives the PPVs 130 from another device that generated by the PPVs 130. In some implementations, the data obtainer 210 generates the PPVs 130 based on information encoded in a semantic construction of a physical environment. In some implementations, the data obtainer 210 provides the PPVs 130 to the action generator 220 and/or the XR environment generator 230.

In various implementations, the action generator 220 generates the action 114 based on the PPV(s) 130. In some implementations, the action 114 is for the XR representation 126 of the VIA 110 shown in FIGS. 1C and 1D. In some implementations, the action generator 220 includes a neural network system that accepts the PPV(s) 130 and/or the perceptual characteristic values 132 as input(s) and outputs the action 114. In some implementations, the action 114 includes detecting one of the XR representations of physical elements 122 based on their corresponding perceptual characteristic values 132. In some implementations, the action 114 includes interacting with one of the XR representations of physical elements 122 based on their corresponding perceptual characteristic values 132. In some implementations, the action generator 220 provides the action 114 to the XR environment generator 230.

In various implementations, the XR environment generator 230 presents the XR environment 120. The XR environment generator 230 also displays the XR representations of physical elements 122, the XR representation 126 of the VIA 110, and the affordances 140 in association with the XR representations of physical elements 122. In some implementations, the XR environment generator 230 displays a manipulation of one of the affordances 140 associated with one of the XR representations of physical elements 122 in order to effectuate the action 114 generated by the VIA 110.

In some implementations, the XR environment generator 230 causes the XR representation 126 of the VIA 110 to move closer to the affordance 140 that is to be manipulated. After the XR representation 126 of the VIA 110 is adjacent to the affordance 140 that is to be manipulated, the XR environment generator 230 causes the XR representation 126 of the VIA 110 to manipulate (e.g., activate) the affordance 140.

Figure 3A:
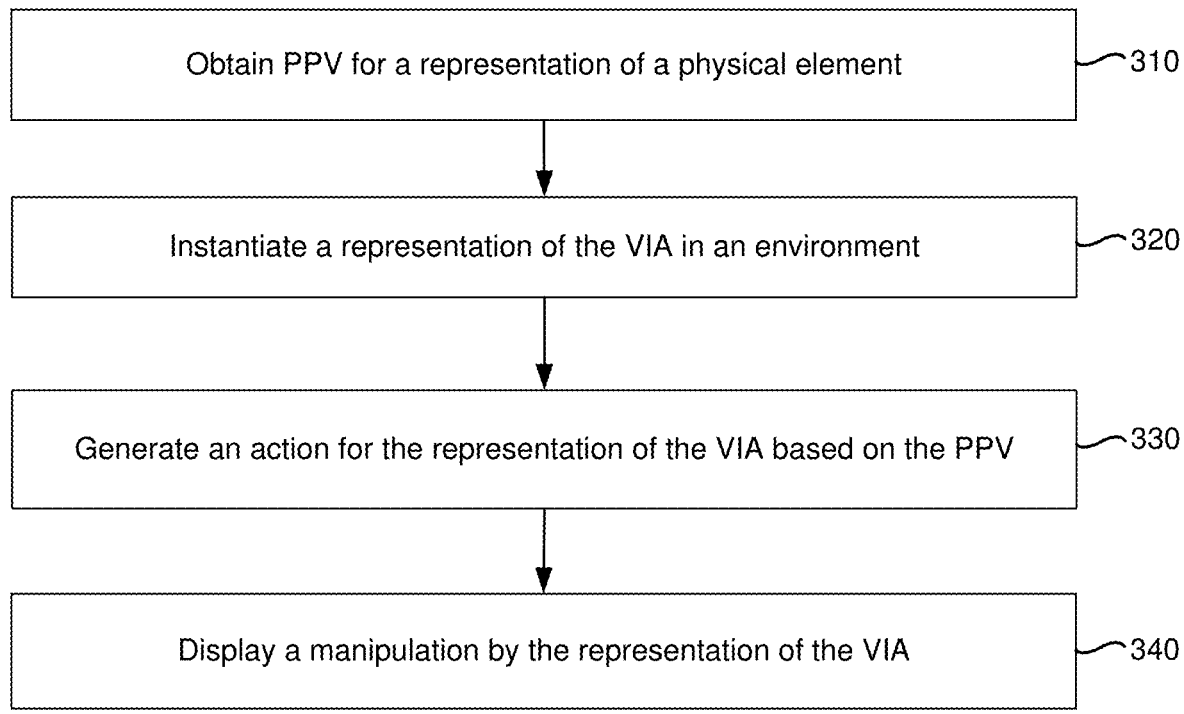
FIGS. 3A-3B are flowchart representations of a method of detecting and interacting with XR representations of physical elements in accordance with some implementations.

FIG. 3A is a flowchart representation of a method 300 of detecting and interacting with XR representations of physical elements in accordance with some implementations. In various implementations, the method 300 is performed by a device with a non-transitory memory and one or more processors coupled with the non-transitory memory (e.g., the electronic device 100 shown in FIGS. 1A-1D and/or the electronic device 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining, by a virtual intelligent agent (VIA), a perceptual property vector (PPV) for an XR representation of a physical element. For example, as shown in FIG. 1A, the VIA 110 obtains the PPVs 130 for the XR representations of physical elements 122. In some implementations, the PPV includes one or more perceptual characteristic values characterizing the XR representation of the physical element. For example, as shown in FIG. 1A, each PPV 130 includes one or more perceptual characteristic values 132 characterizing a corresponding one of the XR representations of the physical elements 122.

As represented by block 320, in some implementations, the method 300 includes instantiating an XR representation of the VIA in an XR environment that includes the XR representation of the physical element and an affordance that is associated with the XR representation of the physical element. For example, as shown in FIG. 1D, the XR environment 120 includes the XR representation 126 of the VIA 110, the XR representations of physical elements 122, and the affordances 140 that are associated with the XR representations of physical elements 122.

As represented by block 330, in some implementations, the method 300 includes generating, by the VIA, an action for the XR representation of the VIA based on the PPV. For example, as shown in FIGS. 1C and 1D, the VIA 110 generates the action 114 for the XR representation 126 of the VIA 110 based on the PPV(s) 130.

As represented by block 340, in some implementations, the method 300 includes displaying a manipulation of the affordance by the XR representation of the VIA in order to effectuate the action generated by the VIA. For example, as shown in FIG. 1D, the XR representation 126 of the VIA 110 is manipulating the television affordance 140a in order to effectuate the action 114 with respect to the XR television 122a (e.g., in order to control the XR television 122a, for example, in order to turn the XR television 122a ON or OFF).

Figure 3B:
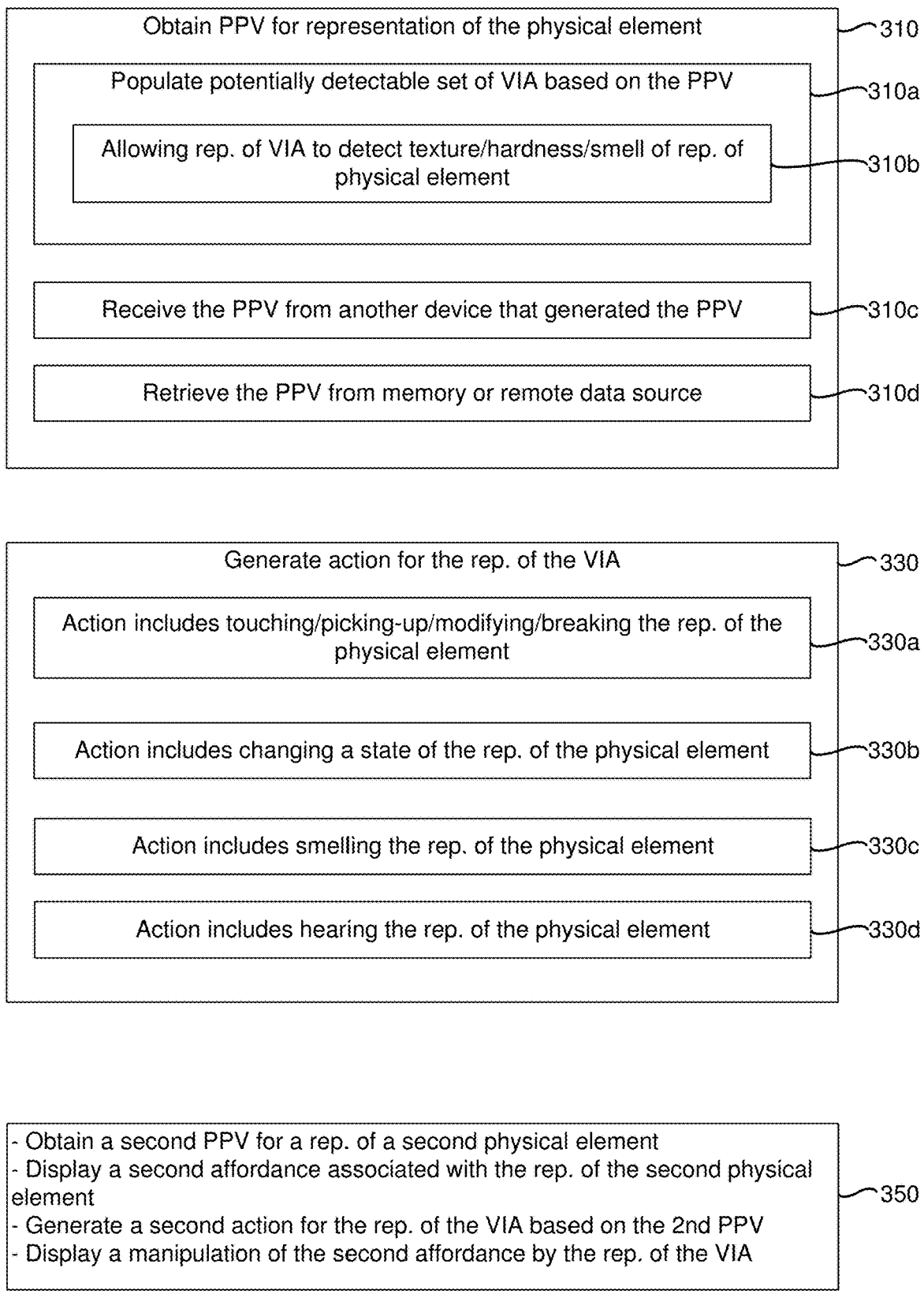

Referring to FIG. 3B, as represented by block 310a, in some implementations, the method 300 includes populating a potentially detectable set of the VIA based on the PPV. For example, as shown in FIG. 1C, the VIA 110 populates the potentially detectable set 112 of the XR representation 126 of the VIA 110 based on the PPV(s) 130. In some implementations, populating the potentially detectable set includes populating a potentially visible subset of the VIA based on the PPV. In some implementations, populating the potentially detectable set includes populating a potentially audible subset of the VIA based on the PPV. In some implementations, populating the potentially detectable set includes populating a potentially smellable subset of the VIA based on the PPV.

As represented by block 310b, in some implementations, populating the potentially detectable set of the VIA allows the XR representation of the VIA to detect and/or interact with the XR representation of the physical element. For example, populating the potentially detectable set 112, shown in FIGS. 1C and 1D, allows the XR representation 126 of the VIA 110 to detect and/or interact with the XR representation of physical elements 122.

As represented by block 310b, in some implementations, populating the potentially detectable set of the VIA allows the XR representation of the VIA to detect a texture of the XR representation of the physical element. For example, populating the potentially detectable set 112, shown in FIGS. 1C and 1D, with texture characteristics of the XR couch 122b allows the XR representation 126 of the VIA 110 to detect (e.g., sense or feel) the texture of the XR couch 122b.

As represented by block 310b, in some implementations, populating the potentially detectable set of the VIA allows the XR representation of the VIA to detect a hardness of the XR representation of the physical element. For example, populating the potentially detectable set 112, shown in FIGS. 1C and 1D, with hardness characteristics of the XR coffee table 122c allows the XR representation 126 of the VIA 110 to detect (e.g., sense or feel) the hardness of the XR coffee table 122c.

As represented by block 310b, in some implementations, populating the potentially detectable set of the VIA allows the XR representation of the VIA to detect a smell associated with the XR representation of the physical element. For example, populating the potentially detectable set 112, shown in FIGS. 1C and 1D, with smell characteristics (e.g., an odor function) of the XR couch 122*b* allows the XR representation 126 of the VIA 110 to detect (e.g., smell) the odor of the XR couch 122*b*.

As represented by block 310*b*, in some implementations, the XR representation of the VIA detects a degree of the smell based on a distance between the XR representation of the VIA and the XR representation of the physical element. For example, populating the potentially detectable set 112, shown in FIGS. 1C and 1D, with an odor function of the XR couch 122*b* allows the XR representation 126 of the VIA 110 to detect (e.g., smell) the odor of the XR couch 122*b* with varying degrees based on a distance between the XR representation 126 of the VIA 110 and the XR couch 122*b*.

As represented by block 310*c*, in some implementations, the method 300 includes receiving the PPV from another device that generated the PPV. As represented by block 310*d*, in some implementations, the method 300 includes retrieving the PPV from the non-transitory memory or a remote data source.

As represented by block 330*a*, in some implementations, the action includes the XR representation of the VIA touching the XR representation of the physical element. For example, in some implementations, the action 114, shown in FIG. 1D, includes the XR representation 126 of the VIA 110 touching the XR couch 122*b* by manipulating the couch affordance 140*b*.

As represented by block 330*a*, in some implementations, the action includes the XR representation of the VIA picking-up the XR representation of the physical element. For example, in some implementations, the action 114, shown in FIG. 1D, includes the XR representation 126 of the VIA 110 picking-up the XR television remote 122*d* by manipulating the television remote affordance 140*d*.

As represented by block 330*a*, in some implementations, the action includes the XR representation of the VIA modifying the XR representation of the physical element. For example, in some implementations, the action 114, shown in FIG. 1D, includes the XR representation 126 of the VIA 110 modifying the XR television remote 122*d* (e.g., by removing XR batteries from the XR television remote 122*d*) by manipulating the television remote affordance 140*d*.

As represented by block 330*a*, in some implementations, the action includes the XR representation of the VIA breaking the XR representation of the physical element. For example, in some implementations, the action 114, shown in FIG. 1D, includes the XR representation 126 of the VIA 110 breaking the XR coffee table 122*c* by manipulating the coffee table affordance 140*c*.

As represented by block 330*b*, in some implementations, the action includes the XR representation of the VIA changing a state of the XR representation of the physical element. For example, in some implementations, the action 114, shown in FIG. 1D, includes the XR representation 126 of the VIA 110 opening/closing the XR door 122*e* by manipulating the door affordance 140*e*.

As represented by block 330*c*, in some implementations, the action includes the XR representation of the VIA smelling an odor associated with (e.g., emanating from) the XR representation of the physical element. For example, in some implementations, the action 114, shown in FIG. 1D, includes the XR representation 126 of the VIA 110 smelling an odor emanating from the XR couch 122*b*.

As represented by block 330*d*, in some implementations, the action includes the XR representation of the VIA hearing a sound generated by (e.g., emitted by) the XR representation of the physical element. For example, in some implementations, the action 114, shown in FIG. 1D, includes the XR representation 126 of the VIA 110 hearing sounds generated by the XR television 122*a*.

As represented by block 350, in some implementations, the method includes obtaining, by the VIA, a second PPV for an XR representation of a second physical element. For example, as shown in FIG. 1A, the VIA 110 obtains respective PPVs 130 for the XR representations of physical elements 122. The second PPV includes one or more perceptual characteristic values characterizing the XR representation of the second physical element. For example, as shown in FIG. 1A, each PPV 130 includes a set of one or more perceptual characteristic values 132. In some implementations, the method 300 includes displaying a second affordance that is associated with the XR representation of the second physical element. For example, as shown in FIG. 1D, the electronic device 100 displays respective affordances 140 in association with the XR representations of physical elements 122. In some implementations, the method 300 includes generating, by the VIA, a second action for the XR representation of the VIA based on the second PPV. For example, the action 114 shown in FIGS. 1C and 1D includes multiple actions. In some implementations, the method 300 includes displaying a manipulation of the second affordance by the XR representation of the VIA in order to effectuate the second action generated by the VIA. For example, as shown in FIG. 1D, the XR representation 126 of the VIA 110 manipulates one of the affordances 140 in order to effectuate the action(s) 114.

Figure 4:
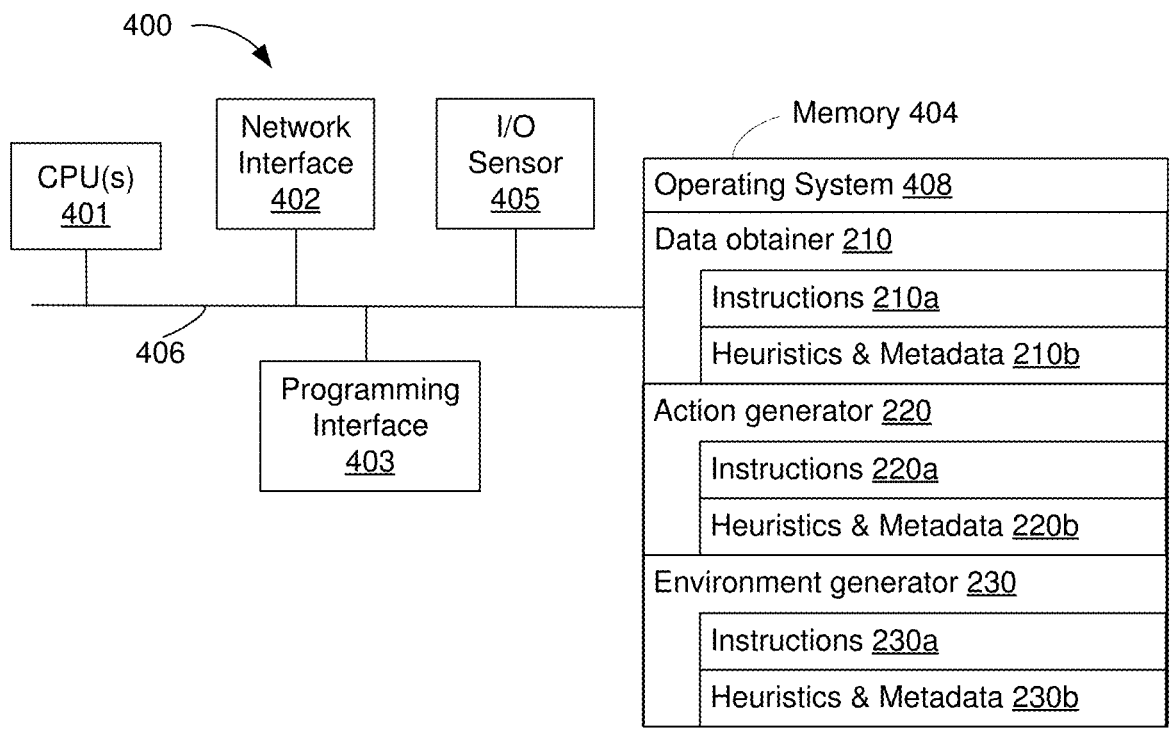
FIG. 4 is a block diagram of a device enabled with various components that enable a VIA to detect and interact with XR representations of physical elements in accordance with some implementations.

FIG. 4 is a block diagram of a device 400 (e.g., the electronic device 100 shown in FIGS. 1A-1D and/or the electronic device 200 shown in FIG. 2) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, input/output (I/O) sensors 405 and one or more communication buses 406 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 406 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the I/O sensor 405 includes an image sensor (e.g., a camera) that captures images and/or videos of a physical environment. In some implementations, the I/O sensor 405 includes a depth sensor that captures depth data for a physical environment.

In some implementations, the memory 404 or the non-transitory computer readable storage medium of the memory 404 stores the following programs, modules and data structures, or a subset thereof including an optional operating system 408, the data obtainer 210, the action generator 220, and the XR environment generator 230. As described herein, in various implementations, the data obtainer 210 obtains a PPV (e.g., the PPVs 130 shown in FIGS. 1A-2). To that end, the data obtainer 210 includes instructions 210a, and heuristics and metadata 210b. As described herein, in various implementations, the action generator 220 generates an action based on the PPV (e.g., the action 114 shown in FIGS. 1C-2). To that end, the action generator 220 includes instructions 220a, and heuristics and metadata 220b. As described herein, in various implementations, the XR environment generator 230 displays a manipulation of the affordance by the XR representation of the VIA in order to effectuate the action. To that end, the XR environment generator 230 includes instructions 230a, and heuristics and metadata 230b.

In some implementations, the VIA 110 shown in FIGS. 1A-1D includes an objective-effectuator. In some implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, XR representations of the objective-effectuators are referred to as object representations, for example, because the XR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective-effectuator representing an environment is referred to as an environmental objective-effectuator. In some implementations, an environmental objective-effectuator performs environmental actions to effectuate an environmental objective.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory, wherein the device includes an action generator:
providing to the action generator for an intelligent agent (IA), one or more perceptual characteristic values that define properties of a graphical representation of a physical element within a degree of similarity to physical properties of the corresponding physical element;
instantiating a graphical representation of the IA in a graphical environment that includes the graphical representation of the physical element and an affordance that is associated with the graphical representation of the physical element;
generating, by the action generator for the IA, an action for the graphical representation of the IA based on the one or more perceptual characteristic values to interact with the graphical representation of the physical element; and
displaying a manipulation of the affordance by the graphical representation of the IA to effectuate the action generated by the action generator for the IA, wherein the manipulation of the affordance allows the graphical representation of the IA to interact with the graphical representation of the physical element within the degree of similarity to interacting with the corresponding physical element according to the physical properties.

2. The method of claim 1, further comprising:
populating a potentially detectable set of the IA based on the one or more perceptual characteristic values.

3. The method of claim 2, wherein populating the potentially detectable set of the IA allows the graphical representation of the IA to detect or interact with the graphical representation of the physical element.

4. The method of claim 2, wherein populating the potentially detectable set of the IA allows the graphical representation of the IA to detect a texture of the graphical representation of the physical element.

5. The method of claim 2, wherein populating the potentially detectable set of the IA allows the graphical representation of the IA to detect a hardness of the graphical representation of the physical element.

6. The method of claim 2, wherein populating the potentially detectable set of the IA allows the graphical representation of the IA to detect a smell associated with the graphical representation of the physical element.

7. The method of claim 6, wherein the graphical representation of the IA detects a degree of the smell based on a distance between the graphical representation of the IA and the graphical representation of the physical element.

8. The method of claim 2, wherein populating the potentially detectable set comprises:
populating a potentially visible subset of the IA based on the one or more perceptual characteristic values.

9. The method of claim 2, wherein populating the potentially detectable set comprises:
populating a potentially audible subset of the IA based on the one or more perceptual characteristic values.

10. The method of claim 2, wherein populating the potentially detectable set comprises:
populating a potentially smellable subset of the IA based on the one or more perceptual characteristic values.

11. The method of claim 1, further comprising:
providing to the action generator for the IA, one or more second perceptual characteristic values that define second properties of a second graphical representation of a second physical element within a second degree of similarity to second physical properties of the corresponding second physical element;
displaying a second affordance that is associated with the second graphical representation of the second physical element;
generating, by the action generator for the IA, a second action for the graphical representation of the IA based on the one or more perceptual characteristic values characterizing the graphical representation of the second physical element; and
displaying a manipulation of the second affordance by the graphical representation of the IA in order to effectuate the second action generated by the action generator for the IA to interact with the second graphical representation of the second physical element within the second degree of similarity to interacting with the corresponding second physical element according to the second physical properties.

12. A device comprising:
one or more processors;
a non-transitory memory;
one or more displays; and
one or more programs, including an action generator, stored in the non-transitory memory, which, when executed by the one or more processors, cause the device to:
provide to the action generator for an intelligent agent (IA), one or more perceptual characteristic values that define properties of a graphical representation of a physical element within a degree of similarity to physical properties of the corresponding physical element;
instantiate a graphical representation of the IA in a graphical environment that includes the graphical representation of the physical element and an affordance that is associated with the graphical representation of the physical element;
generate, by the action generator for the IA, an action for the graphical representation of the IA based on the one or more perceptual characteristic values to interact with the graphical representation of the physical element; and
display a manipulation of the affordance by the graphical representation of the IA to effectuate the action generated by the action generator for the IA, wherein the manipulation of the affordance allows the graphical representation of the IA to interact with the graphical representation of the physical element within the degree of similarity to interacting with the corresponding physical element according to the physical properties.

13. The device of claim 12, wherein the action includes the graphical representation of the IA detecting the graphical representation of the physical element.

14. The device of claim 12, wherein the action includes the graphical representation of the IA touching the graphical representation of the physical element.

15. The device of claim 12, wherein the action includes the graphical representation of the IA picking-up the graphical representation of the physical element.

16. The device of claim 12, wherein the action includes the graphical representation of the IA modifying the graphical representation of the physical element.

17. A non-transitory memory storing one or more programs, including an action generator, which, when executed by one or more processors of a device with a display, cause the device to:
provide to the action generator for an intelligent agent (IA), one or more perceptual characteristic values that define properties of a graphical representation of a physical element within a degree of similarity to physical properties of the corresponding physical element;
instantiate a graphical representation of the IA in a graphical environment that includes the graphical representation of the physical element and an affordance that is associated with the graphical representation of the physical element;
generate, by the action generator for the IA, an action for the graphical representation of the IA based on the one or more perceptual characteristic values to interact with the graphical representation of the physical element; and
display a manipulation of the affordance by the graphical representation of the IA to effectuate the action generated by the action generator for the IA, wherein the manipulation of the affordance allows the graphical representation of the IA to interact with the graphical representation of the physical element within the degree of similarity to interacting with the corresponding physical element according to the physical properties.

18. The non-transitory memory of claim 17, wherein the action includes the graphical representation of the IA detecting the graphical representation of the physical element.

19. The non-transitory memory of claim 17, wherein the action includes the graphical representation of the IA touching the graphical representation of the physical element.

20. The non-transitory memory of claim 17, wherein the action includes the graphical representation of the IA picking-up the graphical representation of the physical element.

21. The non-transitory memory of claim 17, wherein the action includes the graphical representation of the IA modifying the graphical representation of the physical element.

22. The non-transitory memory of claim 17, wherein the action includes the graphical representation of the IA breaking the graphical representation of the physical element.

23. The non-transitory memory of claim 17, wherein the action includes the graphical representation of the IA smelling an odor associated with the graphical representation of the physical element.

24. The non-transitory memory of claim 17, wherein the action includes the graphical representation of the IA changing a state of the graphical representation of the physical element.

* * * * *